July 20, 1965  M. W. REYNOLDS  3,195,485
ORIENTATION PLANTING APPARATUS
Filed May 21, 1963  3 Sheets-Sheet 1
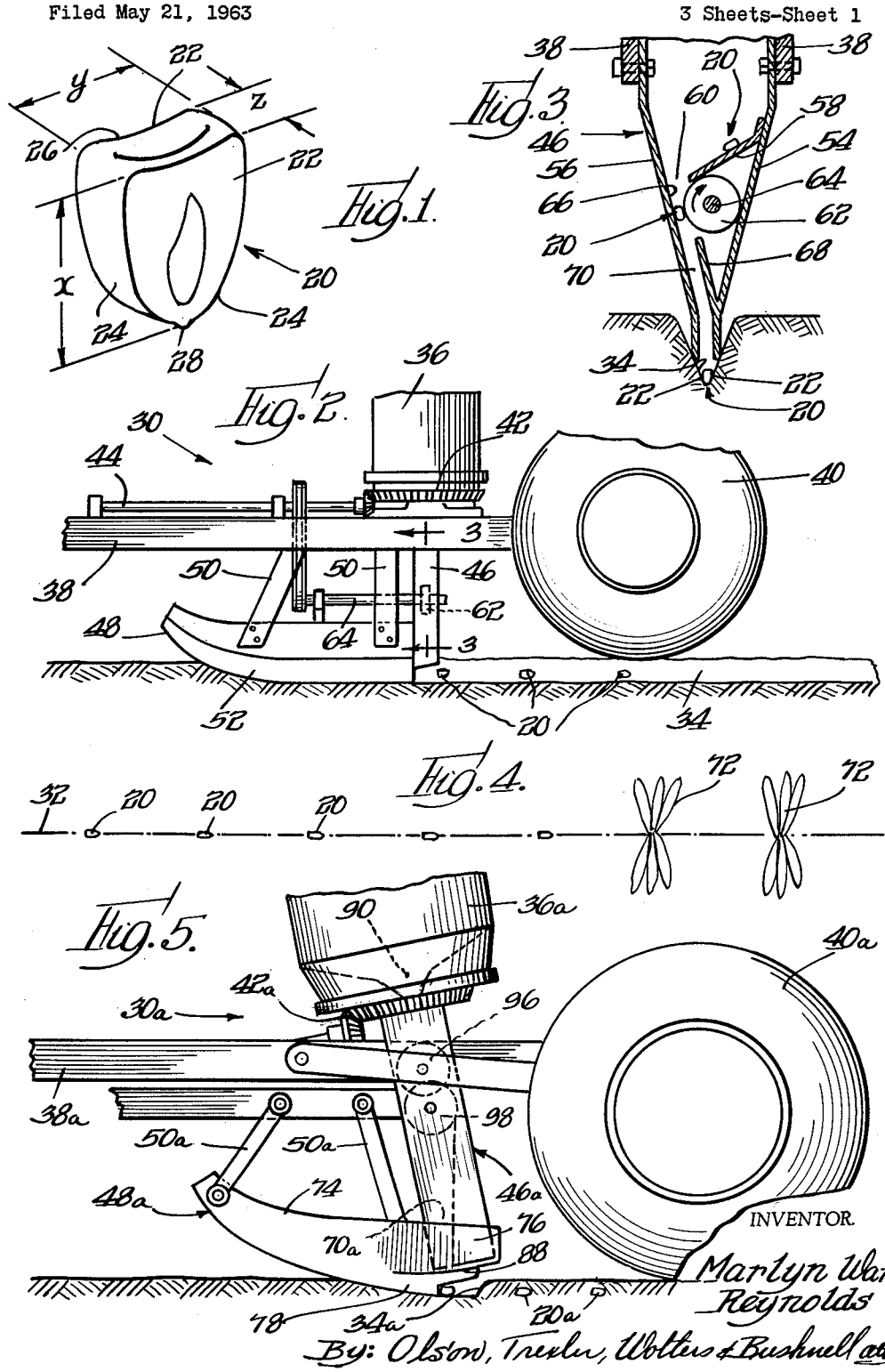
INVENTOR.
Marlyn Ward Reynolds
By: Olson, Trexler, Wolters & Bushnell attys

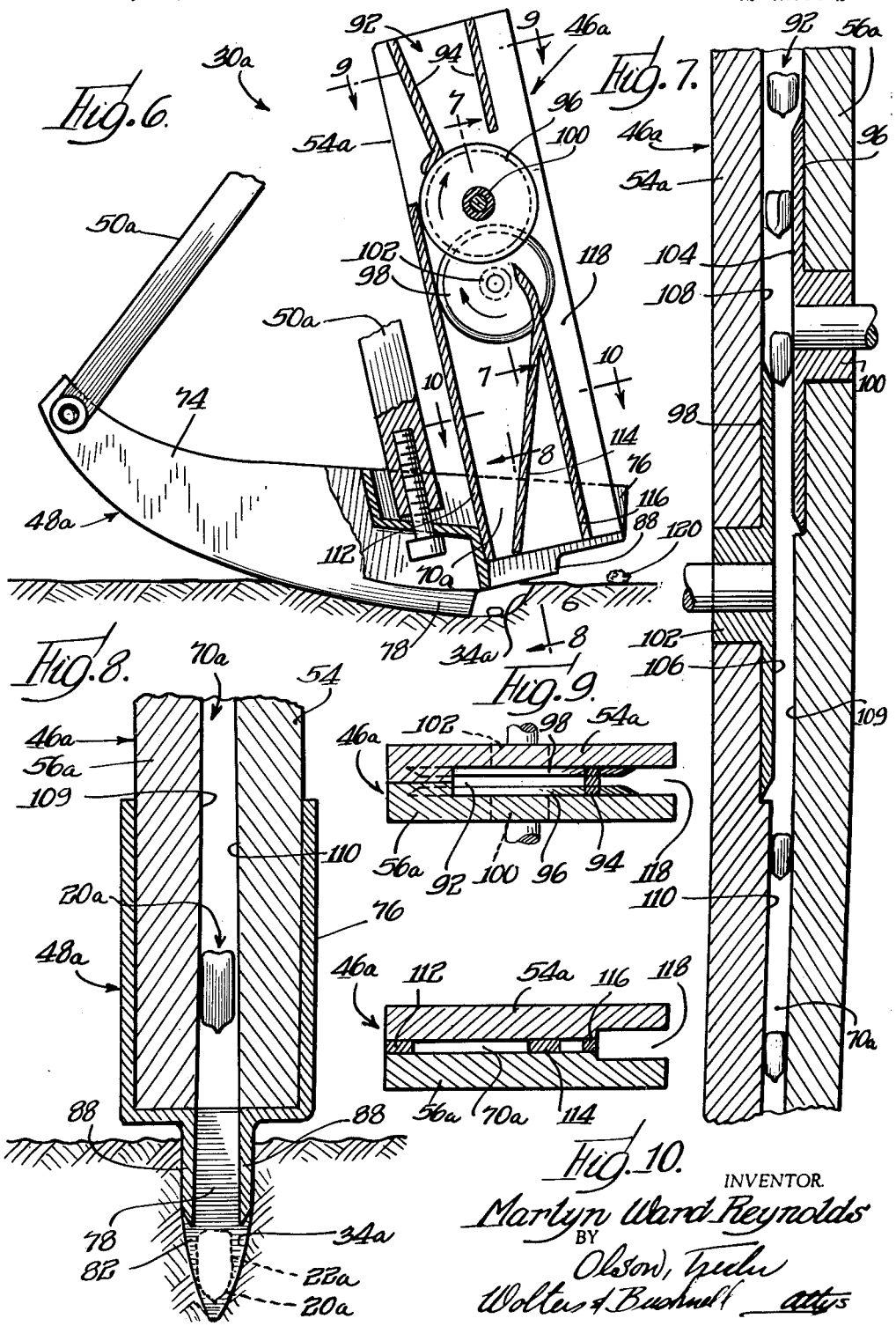

July 20, 1965  M. W. REYNOLDS  3,195,485
ORIENTATION PLANTING APPARATUS
Filed May 21, 1963  3 Sheets-Sheet 3
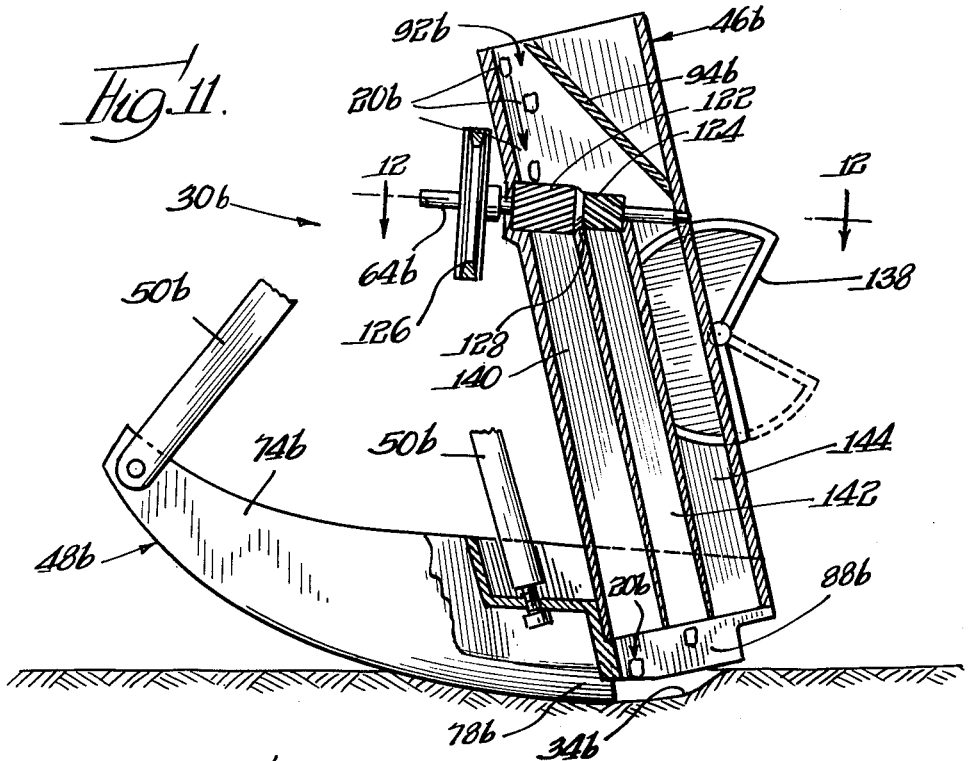
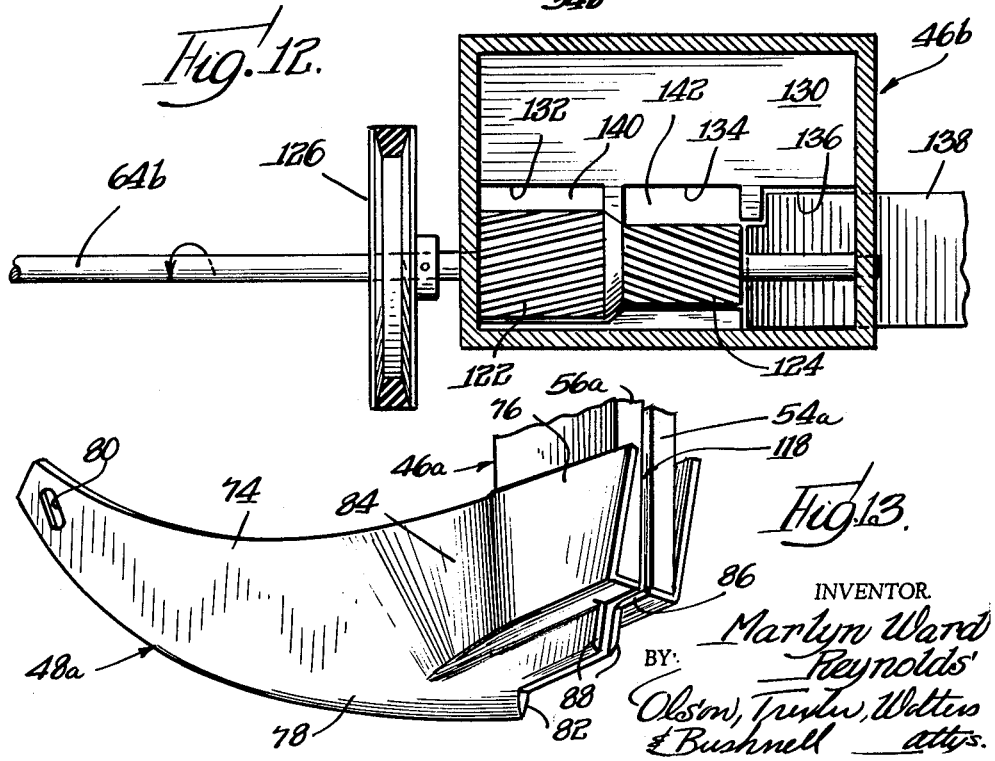
INVENTOR.
Marlyn Ward Reynolds
BY Olson, Trexler, Walters & Bushnell
attys.

United States Patent Office 3,195,485
Patented July 20, 1965

3,195,485
ORIENTATION PLANTING APPARATUS
Marlyn Ward Reynolds, Altona, Ill.
Filed May 21, 1963, Ser. No. 282,539
14 Claims. (Cl. 111—86)

This application is a continuation-in-part of my copending application Serial No. 143,004, filed September 27, 1961, and now abandoned.

This invention relates generally to the field planting of crops, more particularly to the field planting of seed, and especially to the planting of seed having a plane which bears a relationship to the orientation of the leaves of the plant that sprouts from the seed.

In one specific aspect, the present invention relates to the orientation planting of corn seed.

The leaf development of grasses is typically two-ranked and alternate. Maize, or "corn" as it is know in the United States, being a grass, shares this type of leaf development. Moreover, the plane of orientation of the leaves of the maize embryo is known to be parallel to the dorsiventral plane through the embryo, i.e. at right angles to the face or germ side of the corn kernel. Advantage can be taken of this relationship between leaf occurrence and corn seed geometry; and tests have proved that row planting of corn seed whereby to cause the leaves to grow out into the spaces between the rows produces higher yields, probably because the alignment of the leaves tends to conserve moisture, control weeds and expose greater leaf surface to sunlight. Therefore, the term "orientation planting" as used herein is intended to refer to the positioning of the corn seed in the ground so that its flat sides are on a vertical plane and parallel to the longitudinal axis of the row. However, in the past, orientation planting of corn seed has required manual placement of each individual seed in the ground; and although attaching the seed to a tape and adaption of existing commercial planters have been proposed, no successful commercial-scale apparatus has been available heretofore for the orientation planting of corn seed.

Therefore, an important object of the present invention is to provide such apparatus.

A more general object of the invention is to provide new and improved seed planting apparatus.

Another object of the inveniton is to provide planting apparatus that orients and preserves the orientation of the seed being planted.

Still another object of the invention is to provide planting apparatus that carefully handles the seed while orienting it.

And still another object of the invention is to provide orientation planting apparatus that quickly and effectively orients the individual seeds.

A further object of the invention is to provide orientation planting apparatus that positively plants the seeds in the soil in a properly oriented condition.

A yet further object of the invention is to provide orientation planting apparatus in which the seed discharge orifice resists clogging.

These and other objects and features of the invention will become more apparent from a reading of the following descriptions.

Planting apparatus in accord with the invention includes a ground-engaging runner unit which includes a furrow-forming blade of narrow width for making a correspondingly shaped planting furrow. This runner unit also includes a structure which defines a discharge slot that is disposed closely aft of the end of the furrow-forming blade. In addition, the planting apparatus of the invention includes a seed-orienting unit that is adapted to receive randomly situated corn seeds, the orienting unit including structural components for contacting a corn seed at the flat sides thereof whereby to orient the same with the flat sides disposed vertically and situated generally parallel to the direction in which the planting apparatus is to be transported. The seed-orienting unit is connected to the runner unit for delivering oriented corn seeds to the discharge slot.

The invention, both to its structure and mode of operation, will be better understood by reference to the following disclosure and drawings forming a part thereof, wherein:

FIG. 1 is an enlarged perspective view of a typical grain or seed of corn;

FIG. 2 is an elevational view of orientation planting apparatus constructed in compliance with the principles of the invention;

FIG. 3 is an enlarged, vertical sectional view taken substantially along the line 3—3 of FIG. 2;

FIG. 4 is a diagrammatic plan view illustrating the orientation planting of corn seeds in a row, as achieved by the apparatus of the invention, and further illustrating the resultant leaf growth achieved by this orientation;

FIG. 5 is a side elevational view of a modified orientation planting apparatus constructed according to the invention;

FIG. 6 is an enlarged, side elevational view of the apparatus of FIG. 5, shown partially in cross-section to reveal details of the seed-orienting unit;

FIG. 7 is an enlarged, end elevational view taken substantially along the line 7—7 of FIG. 6;

FIG. 8 is an enlarged, end elevational view taken substantially along the line 8—8 of FIG. 6;

FIG. 9 is an enlarged, plan view taken substantially along the line 9—9 of FIG. 6;

FIG. 10 is an enlarged, plan view taken substantially along the line 10—10 of FIG. 6;

FIG. 11 is a side elevational view of another modified embodiment of the orientation planting apparatus of the invention, being shown partially in cross-section to reveal details of the seed-orienting unit;

FIG. 12 is an enlarged, plan view taken substantially along the line 12—12 of FIG. 11; and FIG. 13 is a perspective view of the runner unit used in the orientation planting apparatus of FIG. 6.

Referring now in detail to the drawings, specifically to FIG. 1, a typical kernel or seed of corn is indicated generally by the numeral 20; and as is well known, the corn seed 20 has broad or generally flat sides 22 of approximately triangular outlines. These flat sides are disposed oppositely and one of them is notched and gives rise to the sprouting embryo upon germination. Moreover, the plane of the leaves of the corn embryo is located rather generally at right angles to the flat side or germ face 22. The typical corn seed also has curving, relatively narrow sides 24 that taper from a dimpled top 26 to a tip 28. Thus, the typical corn seed has a certain asymmetric nature and, in addition, is ordinarily possessed of a length or height which exceeds both its width $y$ and its thickness $z$. Furthermore, the width $y$ ordinarily exceeds the thickness $z$. As a consequence, the thickness $z$, being the minor dimension of the corn seed, may be used in conjunction with the flat sides 22 in orienting the seed in a desired fashion.

While most types of seed corn exhibit the described differences in dimension, some variations do exist; and as is well known, seed corn is conventionally sorted into standard grades, the majority of which exhibit the described geometry and are therefore suitable for orientation planting. There is no need to plant the corn seed 20 with its tip 28 down in order to achieve orientation of the leaves of the emerging plant. As a consequence, the seed 20 may be planted in any rotational orientation so long as the flat sides 22 are vertically disposed and positioned parallel to the longitudinal axis of the row being planted.

With reference now to FIGS. 2–4, the principles of the invention are most suitably embodied in a planter 30 of the drill type. The planter 30 is arranged for transport along a row whose longitudinal axis is indicated by a dashed line 32 in FIG. 4; and in compliance with the invention, the planter 30 is arranged to create a planting furrow 34 that is very narrow as is shown in FIG. 3. The narrowness of the furrow 34 acts to hold the corn seeds 20 in an upright position and with their flat sides 22 disposed substantially vertically and parallel to the longitudinal axis of the row.

The planter 30 specifically consists of a seed-containing hopper 36 that is supported on a frame 38, frame 38 being mounted in turn on transport wheels 40. The hopper 36 is provided with a release mechanism 42 which is driven by a shaft 44. The release mechanism 42 operates so as to drop the corn seed a grain at a time into a chute 46, the chute 46 defining a seed-orienting unit. Forwardly of the chute 46, a ground-engaging runner unit 48 is mounted to the frame 38 by arms 50, the runner 48 being provided with a beveled lower edge 52 which acts to cut the narrow furrow 34. With specific reference to FIG. 3, the chute 46 is seen to be provided with lateral sides 54 and 56 which converge in a downward direction. An inclined baffle 58 is mounted between the sides 54 and 56, baffle 58 extending from side 54 to a position closely adjacent side 56 to define a narrow opening 60 through which individual seeds of corn can pass when properly oriented.

To promote orientation of the corn seeds, a roller 62 is mounted on a shaft 64 beneath the baffle 58 to be driven in a direction substantially against the general path of movement of the corn seeds 20. Additionally, the lateral side 56 of the chute 46 defines a fixed surface 66 which confronts the moving surface of roller 62; and surface 66 is spaced from the surface of roller 62 by a distance which is greater than the thickness $z$ of the corn seed, but lesser than the width $y$ or the height $x$ thereof. Thus, the fixed surface 66 cooperates with the moving surface of roller 62 to pass corn seeds having their flat sides 22 disposed vertically and to reject other seeds. A partition 68 is fastened to the lateral side 54 generally below the roller 62, and partition 68 cooperates with the lower portion of lateral side 56 in forming a narrow delivery passageway 70 through which the oriented corn seeds pass to the furrow 34.

It is realized that, when the furrow 34 is made extremely narrow, it will have unstable walls tending to collapse automatically when the beveled lower edge 52 of the runner unit 48 has passed therefrom. Accordingly, the chute 46 is spaced closely aft of the end of the runner unit, and the discharge lips of the chute 46 are spaced above the lower edge of the runner unit to expose the corn seed passing therefrom to the incipiently collapsing walls of the planting furrow. If desired, spaced shoes or other implements may be used to close the furrow completely and firm the soil thereover in accordance with well-known procedures.

When the corn seeds 20 have been orientation planted in the row whose axis is indicated by the numeral 32 in FIG. 4 in compliance with the invention and employing the planter 30 just described, corn plants 72 will spout from the seed 20, and the leaves will emerge from these plants to extend primarily into the spaces between the rows rather than toward adjacent stalks within the row. Thus, there will be less crowding of the leaves within each row, and the various leaves will find a greater exposure to the sunlight. The shade cast by the leaves on the area between the rows has been found to conserve moisture and suppress weed growth. Higher yields per acre result.

While a particular embodiment of the invention has been thus far shown and described, it should be understood, of course, that the invention is not limited thereto since many modifications may be made. Therefore and in order to enhance the understanding of the invention, two modified embodiments of the invention are herein shown and described. Since similar components appear in the several illustrated embodiments of the invention, like numerals have been used to designate like parts throughout the drawings, the suffix letter "$a$" being employed to distinguish those common elements associated with the embodiment of FIGS. 5–10 and 13 and the suffix letter "$b$" being used to distinguish those common elements associated with the embodiment of FIGS. 11 and 12.

The planter 30$a$ which is illustrated in FIGS. 5–10 and 13 is particularly distinguished by the arrangement of the runner unit 48$a$ and the arrangement of the seed-orienting unit 46$a$; and with specific reference first to FIGS. 8 and 13, the runner unit 48$a$ will be seen to comprise a forward plate 74, a box-like shoe 76 and a furrow-forming blade 78. The plate 74 is adapted to be disposed vertically for engagement with the ground surface to be planted; and in addition, the plate 74 is perforated with an aperture 80 that is employed in mounting the runner unit 48$a$ to the transporting machine. The blade 78 depends from the plate 74 and is fashioned to take narrow width in order to make a correspondingly shaped planting furrow. Such a narrow furrow has unstable walls when formed in the type and condition of soil which is practicable for corn planting; and as has been pointed out hereinabove, the unstable walls of the furrow cooperate to preserve the orientation of the seed placed therebetween. The blade 78 terminates in a tail 82 and takes a generally triangular cross-section in order to form a furrow of the V-groove type. A furrow of this latter shape has been found to promote retention of the desired orientation of the individual corn seeds.

The shoe 76 is situated at the rear of plate 74 and merges therewith by means of tapering walls 84. Additionally, the shoe 76 has an open top for receiving the lower end of seed-orienting unit 46$a$, the shoe being arranged to situate the unit 46$a$ closely aft of the end or tail 82 of the blade 78. In addition, the floor of shoe 76 is fashioned with a seed-discharge slot 86 that generally underlies the delivery passageway of the seed orienting unit 46$a$. The edges of discharge slot 86 are connected to generally vertically disposed, parallel, planter blades 88 that depend from the shoe 76 to extend the discharge slot into close proximity with the tail 82 of blade 78. Thus, the discharge slot is situated closely aft of the furrow-forming blade 78, and the discharge lips of the slot are spaced above the low edge of the blade to expose the corn seed passing therefrom to the incipiently collapsing walls of the planting furrow.

As is particularly well shown in FIG. 8, the tail 82 of blade 78 takes a size and outline closely approximating that of a corn seed 20$a$. Moreover, the confronting faces of the planter blades 88 are arranged to be parallel for passing the oriented corn seed through to the furrow 34$a$ which is being formed. These confronting faces of the planter blades 88 are spaced apart by a distance which is greater than the thickness $z$ of the corn seeds but less than the width $y$ thereof, this spacing coresponding to the spacing between the edges of the discharge slot 86 that is formed in the floor of the shoe 76. The outside faces of the planter blades 88 need not be strictly parallel and may taper downwardly in order to enhance the formation of a V-groove furrow.

As is shown in FIGS. 5 and 6, the tail or nether-end of the discharge slot 86 and the rear or free ends of the planter blades 88 are raised out of engagement with the ground. This arrangement prevents clogging of the discharge passageway and insures delivery of the individual corn seeds to the furrow.

The chute or seed-orienting unit 46$a$ also distinguishes the planter 30$a$; and with reference to FIGS. 6 and 7, the lateral sides 54a and 56a are seen to be defined by separate plates. Referring momentarily to FIG. 5, the hopper 36a is seen fashioned with a discharge throat 90 that leads to the seed-orienting unit 46a; and returning to FIGS. 6 and 7, the upper ends of the lateral sides 54a and 56a are relieved at their confronting surfaces to form a seed inlet channel 92. Spacers 84 may be disposed at the margins of the channel 92 to cooperate with or enhance the formation of channel 92 if desired. The seed inlet channel 92 is sufficiently wide to accept a corn seed from the throat 90 in any position of orientation of the seed, channel 92 additionally having a width substantially greater than its thickness as is indicated in FIG. 9. Accordingly, the channel 92 is arranged to receive randomly disposed corn seeds.

At a position underlying the channel 92, the seed-orienting unit 46a incorporates rotatable disc members 96 and 98 which include integral hubs 100 and 102 respectively. These hubs are employed in connecting the respective disc members to individual drive shafts. The disc members 96 and 98 define seed-contacting surfaces 104 and 106; and these surfaces are adapted to be rotated substantially against the general path of movement of the corn seeds in their journey from the channel 92 to the discharge slot 86 in the runner unit 48a. Specifically, the seed contacting surfaces of the disc members 96 and 98 are continuously driven in the angular direction indicated by the arrows in FIG. 6. Rotation of the disc members 96 and 98 in the described fashion encourages proper orientation of the individual corn seeds without any concomitant tendency to grind or otherwise damage the kernels. The disc members 96 and 98 are also fabricated with beveled edges to further the ready orientation of the corn seeds without damage thereto.

Considering FIG. 7, the side 54a is seen to provide a fixed surface 108 which confronts the moving surface 104 of disc member 96 to cooperate therewith in forming a first stage in the orientation of the corn seeds passing through the channel 92. The surfaces 104 and 108 are spaced by a distance less than but closely approximating the width $y$ of a corn seed. Moreover, while the disc members 96 and 98 have their rotational axes spaced apart along the path of movement of the corn seeds, these disc members are arranged to overlap by a distance corresponding to approximately the radius thereof as is well shown in FIG. 7. At the overlapping portions of the disc members, the seed-orienting surfaces 104 and 106 thereof are spaced by a distance that is greater than the thickness $z$ of one of the corn seeds but less than the width $y$ thereof. Confronting seed-orienting surface 106, the side 56a defines a fixed surface 109 which is spaced from surface 106 by the same distance that the surface 104 is spaced from the surface 106. As a result of these arrangements, a corn seed entering the channel 92 is partially oriented by the upper half of disc member 96. Orientation of the seed is completed at the over-lapping portions of the disc members 96 and 98. Thereafter, the surface 109 cooperates with the surface 106 of the disc member 98 in preserving the established orientation.

As has been described hereinabove, the desired orientation of the individual corn seeds involves their situation so that the flat sides 22a are substantially vertical. Beneath the disc member 98, the side 54a is provided with a surface 110 which confronts the surface 109 of side 56a, these latter confronting surfaces acting to define the passageway 70a that leads to the discharge slot of the runner unit 46a. The spacing between surfaces 109 and 110 may be established by appropriately relieving the confronting portions of the lateral sides 54a and 56a; or alternatively, spacer elements 112, 114, and 116 may be interposed between the sides 54a and 56a for this purpose, these spacer elements being well shown in FIGS. 6 and 10. Furthermore, the spacer element 114 may be angulated somewhat to taper the passageway 70a longitudinally and toward the lower end thereof. In any event, the lower end of the passageway 70a is advantageously arranged to be wider than a distance equal to double the height $x$ of the corn seeds 20a in order that two seeds may exit from the passageway at the same time without tending to clog or form a dam therein. In addition, the confronting surfaces 109 and 110 are slightly flared apart laterally toward the bottom of the unit 46a. This is shown in FIG. 8. This flaring of the surfaces 109 and 110 is only very slight and is utilized to insure delivery of the oriented seed without disturbing the orientation thereof.

As will be recognized, the disc members 96 and 98 cooperate to orient the vast majority of the seeds passing into the inlet channel 92. However, the disc members 96 and 98 also act to reject oversized seeds, cob particles and other debris; and in order to prevent accumulation of such foreign matter in the channel 92, the unit 46a is provided with a debris passageway 118 opening from the rear edge thereof, as is well shown in FIGS. 6, 9 and 10. Because of their direction of rotation, the disc members 96 and 98 cooperate to discharge debris through the rearwardly opening passageway 118; and because of the rearward disposition of the passageway 118, debris, such as the cob particle 120 shown in FIG. 6, is cast onto the surface of the ground behind the runner unit 48a. Such debris is prevented from entering the planting furrow 34a because the walls of the furrow are in the process of collapsing immediately behind the blade 78, and this collapsing of the walls of the furrow around the oriented seeds is completed before the particles of debris have an opportunity to be deposited in the furrow. Discharging of the rejected material onto the ground surface rather than into the planting furrow is of advantage particularly when a portion of the rejected material constitutes seed. Of course, the rejected material is randomly oriented; and if planted, a randomly oriented corn seed in the rejected material would produce undesirable, randomly oriented stalks of corn.

Whereas the planter 30a is distinguished by the arrangement of both the runner unit 48a and the seed-orienting unit 46a, the planter 30b which is illustrated in FIGS. 11 and 12 is distinguished by the particular arrangement of the seed-orienting unit 46b. Specifically and with reference first to FIG. 11, the unit 46b will be seen to include a barrell or cylinder 122 and a smaller diameter barrel or cylinder 124, these cylinders being mounted on shaft 64b for rotation therewith. A pulley 126 is affixed to shaft 64b for applying motive force thereto. The cylinders 122 and 124 are separated by a frusto-conical section 128 and are located at the bottom of seed inlet channel 92b. The cylinders 122 and 124 are arranged to orient respectively relatively smaller sized corn seeds and relatively larger sized corn seeds. Hence, the corn seeds 20b which enter the channel 92b are desirably directed into contact with the cylinder 122 prior to being directed into contact with the cylinder 124. Moreover, the shaft 64b is declined rearwardly to tilt the axes of cylinders 122 and 124 in order to promote this progressive movement of the corn seeds.

In addition and considering the FIG. 12, the unit 46b will be seen to include a plate 130 that is disposed laterally of the cylinders 122 and 124 at approximately the center line thereof to define a fixed surface 132 adjacent cylinder 122 and a fixed surface 134 adjacent cylinder 124. The fixed surface 132 is spaced from the moving surface of cylinder 122 by a distance greater than the thickness of the seeds of one grade of corn but lesser than the width thereof in order to cooperate in passing corn seeds of this grade in such a fashion that the flat sides thereof are disposed vertically. Similarly, the fixed surface 134 is spaced from the moving surface of cylinder 124 by a distance greater than the thickness of the larger seeds of a record grade of corn but lesser than the width thereof in order to pass corn seeds of this latter grade in such a fashion that their flat sides are disposed vertically. As a result, the unit 46b is able to orient either of two sizes or grades of corn seeds and is even able to achieve a certain degree of sorting of seed of mixed sizes. The sequential arrangement of the cylinders 122 and 124 promotes these advantages because the seed delivered through the channel 92b are worked on first by the cylinder 122 and subsequently by the cylinder 124.

The plate 130 is also fashioned with an aperture 136 situated rearwardly of the cylinder 124, and the aperture 136 is intended to pass cob particles and other debris to an arcuately rotatable valve 138. The valve 138 may be of the manually operable type and is arranged to collect the debris passed by cylinder 124 to the aperture 136. Periodically, the valve 138 will be manipulated to discharge the collected debris. The cylinders 122 and 124 may be provided with fine grooves or delicate knurling if desired.

The lower end of seed-orienting unit 46b includes a pair of vertically elongated, rectangular delivery passageways 140 and 142 which are associated respectively with the cylinders 122 and 124. The unit 46b also includes a debris passageway 144 that underlies the aperture 136. The confronting walls of passageways 140 and 142 are aligned respectively with the fixed and movable orienting surfaces associated therewith, these confronting walls being spaced correspondingly to pass the corn seeds to the discharge slot of runner unit 48b in continuance of the oriented condition of such seed. If desired, the passageways 140 and 142 may flare slightly in a downward direction in order to prevent clogging by the seed passing therethrough.

In order to cooperate with the dual orienting arrangement of the unit 46b, the runner unit 48b is fashioned with a horizontally elongated delivery slot and a correspondingly elongated planter blade 88b. In addition, the furrow forming blade 78b is made with a broader section to form a furrow 34b the walls of which collapse somewhat more slowly whereby to accommodate and preserve the orientation of seeds exiting from the passageway 142.

Provision of the passageway 144 and the valve 138 also permits use of the planter 30b in the more conventional manner. Specifically, the cylinder 122 and 124 may be covered with a rearwardly sloping plate, not shown, which directs all of the kernels into the passageway 144. The valve 138 is then operated periodically to function as a drop planter or, alternatively, is left open to function as a drill planter.

It is to be recognized that the three illustrated and described seed-orienting units are arranged to be carried with the associated runner unit so that the seed-discharge slot has its confronting faces aligned parallel with the longitudinal axis of the row being planted, the orienting unit itself delivering oriented seeds to the discharge slot with the flat sides of the seed parallel with the confronting faces of the slot. Thus, each of the planters 30, 30a and 30b is operated to plant the individual seeds with the flat sides thereof disposed vertically and in alignment with the longitudinal axis of the row being planted. Further details of the operation of the planters 30, 30a, and 30b will be apparent from the foregoing descriptions.

The specific examples herein shown and described are to be considered as being primarily illustrative. Various changes in structure beyond those described will, no doubt, occur to those skilled in the art; and such changes are to be understood as forming a part of this invention insofar as they fall within the spirit and scope of the appended claims.

I claim:

1. Apparatus for planting seeds with their flat sides disposed vertically, said apparatus comprising: ground-engaging means including furrow-forming blade means of narrow width for making a correspondingly shaped planting furrow, said ground-engaging means further including means defining a seed-discharge slot shaped and dimensioned to preserve an oriented condition of seeds delivered thereto and disposed closely aft of the end of said blade means; and orienting means adapted to receive randomly disposed seeds and including means contacting a seed at a flat side thereof to orient the same with the flat side of said seed disposed vertically, said orienting means being connected to said ground-engaging means for delivering oriented seeds to said discharge slot, said seed-contacting means including a fixed surface and a cooperating, moving surface.

2. Apparatus for planting seeds with their flat sides disposed vertically, said apparatus comprising: ground-engaging means including furrow-forming blade means of narrow width for making a correspondingly shaped planting furrow, said ground-engaging means further including means defining a seed-discharge slot shaped and dimensioned to preserve an oriented condition of seeds delivered thereto and disposed closely aft of the end of said blade means; and orienting means adapted to receive randomly dispose seeds and including means contacting a seed at a flat side thereof to orient the same with the flat side of said seed disposed vertically, said orienting means being connected to said ground-engaging means for delivering oriented seeds to said discharge slot, said seed-contacting means including cooperatively moving surfaces.

3. Apparatus for planting seeds with their flat sides disposed vertically, said apparatus comprising: ground-engaging means including furrow-forming blade means of narrow width for making a correspondingly shaped planting furrow, said ground-engaging means further including means defining a seed-discharge slot shaped and dimensioned to preserve an oriented condition of seeds delivered thereto and disposed closely aft of the end of said blade means; and orienting means adapted to receive randomly disposed seeds and including means contacting a seed at a flat side thereof to orient the same with the flat side of said seed disposed vertically, said orienting means being connected to said ground-engaging means for delivering oriented seeds to said discharge slot, said seed-contacting means including a fixed surface and a cooperating, moving surface, said moving surface moving substantially against the general path of movement of said seeds toward said discharge slot.

4. Apparatus for planting seeds with their flat sides disposed vertically, said apparatus comprising: ground-engaging runner means including furrow-forming blade means of narrow width for making a correspondingly shaped planting furrow, said ground-engaging means further including means defining a seed-discharge slot shaped and dimensioned to preserve an oriented condition of seeds delivered thereto and disposed closely aft of the end of said blade means; and orienting means adapted to receive randomly disposed seeds and including means contacting a said seed at a flat side thereof to orient the same with the flat side of said seed disposed vertically, said orienting means being connected to said ground-engaging means for delivering oriented seeds to said discharge slot, said seed-contacting means including two cooperatively moving surfaces each of which is moving substantially against the general path of movement of said seeds toward said discharge slot.

5. Apparatus for planting corn seeds with their flat sides disposed vertically, said apparatus comprising: container means for randomly oriented corn seeds, including a discharge throat; ground-engaging runner means including blade means for making a planting furrow, said runner means further including means defining a seed-discharge slot shaped and dimensioned to preserve an oriented condition of seeds delivered thereto and disposed closely aft of the end of said blade means; and orienting means between said throat and said slot, including a first surface and a second, continuously moving surface spaced from said first surface by a distance greater than the thickness of said corn seeds but less than the width thereof, said surfaces cooperating to pass corn seeds having their flat sides disposed vertically and to reject other seeds.

6. Apparatus for planting corn seeds with their flat sides disposed vertically, said apparatus comprising: container means for randomly oriented corn seeds, including a discharge throat; ground-engaging runner means including furrow-forming blade means of narrow width for making a correspondingly shaped planting furrow having unstable walls, said runner means further including means defining a seed-discharge slot shaped and dimensioned to preserve an oriented condition of seeds delivered thereto and disposed closely aft of the end of said blade means, and discharge lips of said slot being spaced above the lower edge of said blade means to expose the corn seeds passing therefrom to the incipiently collapsing walls of the planting furrow; and orienting means between said throat and said slot, including a first surface and a second, continuously moving surface spaced from said first surface by a distance greater than the thickness of said corn seed but less than the width thereof, said surfaces cooperating to pass corn seeds having their flat sides disposed vertically and to reject other seeds.

7. Apparatus for planting corn seeds with their flat sides disposed vertically, said apparatus comprising: container means for randomly oriented corn seeds, including a discharge throat; ground-engaging runner means including blade means for making a planting furrow, said runner means further including means defining a seed-discharge slot shaped and dimensioned to preserve an oriented condition of seeds delivered thereto and disposed closely aft of the end of said blade means; and orienting means between said throat and said slot, including a first surface and a second, continuously moving surface spaced from said first surface by a distance greater than the thickness of said corn seeds but less than the width thereof, said surfaces cooperating to pass corn seeds having their flat sides disposed vertically and to reject other seeds, said orienting means further including a delivery passageway having confronting walls aligned respectively with said first and second surfaces and spaced a corresponding distance to pass the corn seeds to said slot in continuance of their oriented condition, said confronting walls being flared apart from said first and second surfaces to said slot whereby to insure proper delivery of the oriented seeds.

8. Apparatus for planting corn seeds with their flat sides disposed vertically, said apparatus comprising: container means for randomly oriented corn seeds, including a discharge throat; ground-engaging runner means including blade means for making a furrow, said runner means further including means defining a seed-discharge slot shaped and dimensioned to preserve an oriented condition of seeds delivered thereto and disposed closely aft of the end of said blade means and vertically disposed, spaced planter blades connected to the edges of said discharge slot and having parallel confronting faces for passing oriented corn seed in continuance of the orientation thereof; and orienting means between said throat and said slot, including a first surface and a second, continuously moving surface spaced from said first surface by a distance greater than the thickness of said corn seeds but less than the width thereof, said surfaces cooperating to pass corn seeds having their flat sides disposed vertically and to reject other seeds.

9. Apparatus for planting corn seeds with their flat sides disposed vertically, said apparatus comprising: container means for randomly oriented corn seeds, including a discharge throat; ground-engaging runner means including furrow-forming blade means of narrow width for making a correspondingly shaped planting furrow having unstable walls, said runner means further including means defining a seed-discharge slot shaped and dimensioned to preserve an oriented condition of seeds delivered thereto and disposed closely aft of the end of said blade means, the discharge lips of said slot exposing the corn seed passing therefrom to the incipiently collapsing walls of the planting furrow, said slot being inclined upwardly and rearwardly to raise the tail thereof out of engagement with the ground whereby to prevent clogging and whereby to insure discharge of seed therethrough; and orienting means between said throat and said slot, including a first surface and a second, continuously moving surface spaced from said first surface by a distance greater than the thickness of said corn seeds but less than the width thereof, said surfaces cooperating to pass corn seeds having their flat sides disposed vertically and to reject other seeds.

10. Apparatus for planting corn seeds with their flat sides disposed vertically, said apparatus comprising: container means for randomly oriented corn seeds, including a discharge throat; ground-engaging runner means including furrow-forming blade means of narrow width for making a correspondingly shaped planting furrow having unstable walls, said runner means further including means defining a seed-discharge slot shaped and dimensioned to preserve an oriented condition of seeds delivered thereto and disposed closely aft of the end of said blade means, the discharge lips of said slot exposing the corn seed passing therefrom to the incipiently collapsing walls of the planting furrow; orienting means between said throat and said slot, including a first surface and a second, continuously moving surface spaced from said first surface by a distance greater than the thickness of said corn seeds but less than the width thereof, said surfaces cooperating to pass corn seeds having thir flat sides disposed vertically and to reject other seeds; and disposal means connected to said orienting means to receive seeds and material rejected by said cooperating surfaces, said disposal means having an exit aperture spaced rearwardly of said seed-discharge slot for depositing rejected seed and material on the surface of the closed furrow.

11. Apparatus for planting corn seeds with their flat sides disposed vertically, said apparatus comprising: container means for randomly oriented corn seeds, including a discharge throat; ground-engaging runner means including blade means for making a planting furrow and including means defining a seed-discharge slot shaped and dimensioned to preserve an oriented condition of seeds delivered thereto and disposed closely aft of the end of said blade means; and orienting means between said throat and said slot, including a pair of moving surface means aligned in sequence with said throat, a second surface means cooperatively spaced from each of said moving surface means, and separate passageway means aligned with the space between each of said moving and second surface means, the sequentially forward, moving surface means being spaced from its associated second surface means by a distance greater than the thickness of corn seeds of a first grade but less than the width thereof whereby to pass corn seeds of this grade having their flat sides disposed vertically and whereby to reject other seeds, the sequentially rearward, moving surface means being spaced from its associated second surface means by a distance greater than the thickness of corn seeds of a second grade, but less than the width thereof whereby to pass corn seeds of this second grade having their flat sides disposed vertically and whereby to reject other seeds.

12. Apparatus according to claim 11 wherein each of said moving surface means is endless and wherein the sequentially rearward, moving surface means is gravitationally inferior to the sequentially forward, moving surface means whereby said sequentially rearward, moving surface means receives the seeds rejected by the sequentially forward, moving surface means.

13. In apparatus for planting seeds with their flat sides disposed vertically, seed-orienting means comprising: chamber means for receiving randomly disposed seeds; chute means aligned beneath said chamber means and including a substantially vertically passageway for passing seeds under the influence of gravity; relatively fixed surface means disposed in said passageway for contacting a falling seed at a flat side thereof; and relatively movable surface means spaced from said relatively fixed surface means for contacting a seed and inducing a turning thereof to display a flat side to said relatively fixed surface means, whereby said relatively movable surface means cooperates with said relatively fixed surface means to orient said seed with the flat sides thereof disposed vertically.

14. In apparatus according to claim 13, the combination which further comprises planter means including a seed-discharge slot disposed at the lower end of said chute means and having confronting walls spaced apart by a distance greater than the dimension of the narrow sides of said seed but less than the dimension of the broad sides thereof whereby to preserve an oriented condition of seeds delivered thereto.

References Cited by the Examiner

UNITED STATES PATENTS

| | | | |
|---|---|---|---|
| 551,235 | 12/95 | Shore | 111—86 X |
| 732,987 | 7/03 | Woodland | 221—168 |
| 742,872 | 11/03 | Jacobs | 111—83 |
| 872,363 | 12/07 | McGuire | 111—80 |
| 1,009,658 | 11/11 | Eils et al. | 221—167 |
| 2,315,204 | 3/43 | Holle | 111—86 |
| 2,379,724 | 7/45 | Lanham | 111—51 |

OTHER REFERENCES

Publication: "Agricultural Research," vol. 7, No. 9, March 1959, pages 6 and 7.

ABRAHAM G. STONE, *Primary Examiner.*

WILLIAM A. SMITH III, *Examiner.*